US011003557B2

(12) United States Patent
Lyu et al.

(10) Patent No.: US 11,003,557 B2
(45) Date of Patent: May 11, 2021

(54) DYNAMIC DATA RESTORATION FROM MULTIPLE RECOVERY SITES IMPLEMENTING SYNCHRONOUS REMOTE MIRRORING (71) Applicant: International Business Machines Corporation, Armonk, NY (US)

(72) Inventors: Gang Lyu, Shanghai (CN); Bo Zou, Shanghai (CN); Yang Liu, Shanghai (CN)

(73) Assignee: International Business Machines Corporation, Armonk, NY (US)

(*) Notice: Subject to any disclaimer, the term of this patent is extended or adjusted under 35 U.S.C. 154(b) by 136 days.

(21) Appl. No.: 16/215,239

(22) Filed: Dec. 10, 2018

(65) Prior Publication Data
US 2020/0183800 A1 Jun. 11, 2020

(51) Int. Cl.
G06F 11/20 (2006.01)

(52) U.S. Cl.
CPC .... *G06F 11/2082* (2013.01); *G06F 2201/805* (2013.01); *G06F 2201/82* (2013.01)

(58) Field of Classification Search
CPC ............. G06F 11/2082; G06F 2201/82; G06F 2201/805
USPC ....................................................... 714/4.11
See application file for complete search history.

(56) References Cited

U.S. PATENT DOCUMENTS

| | | | |
|---|---|---|---|
| 6,948,089 B2 | 9/2005 | Fujibayashi | |
| 7,120,769 B2 | 10/2006 | Yagawa et al. | |
| 7,139,932 B2 | 11/2006 | Watanabe | |
| 8,234,517 B2 | 7/2012 | Bamford et al. | |
| 9,069,800 B2 | 6/2015 | Habermann et al. | |
| 9,405,635 B2 | 8/2016 | Vijayan et al. | |
| 9,582,381 B2 | 2/2017 | Malnati et al. | |
| 9,740,574 B2 | 8/2017 | Kochunni et al. | |
| 2004/0220981 A1 | 11/2004 | Taylor | |
| 2007/0214196 A1 | 9/2007 | Garimella et al. | |
| 2011/0082832 A1 | 4/2011 | Vadali et al. | |
| 2015/0286545 A1* | 10/2015 | Brown ................ | G06F 11/2079 714/6.23 |

* cited by examiner

*Primary Examiner* — Yair Leibovich
(74) *Attorney, Agent, or Firm* — Zilka-Kotab, P.C.

(57) ABSTRACT

A computer-implemented method, according to one embodiment, includes: detecting an outage at a production site, and transferring I/O functionality to a first recovery site. In response to resolving the outage, first and second out-of-sync bitmaps are received from the first and second recovery sites, respectively. The out-of-sync bitmaps are merged together. Performance data which corresponds to achievable throughput is received from each of the first and second recovery sites, and the performance data is used to divide the merged out-of-sync bitmap into two portions. A request is sent to the first recovery site for data which corresponds to the first portion of the merged out-of-sync bitmap. Similarly, a request is sent to the second recovery site for data which corresponds to the second portion of the merged out-of-sync bitmap. Finally, data is received which corresponds to the first and second portions of the merged out-of-sync bitmap respectively, in parallel.

20 Claims, 7 Drawing Sheets

DYNAMIC DATA RESTORATION FROM MULTIPLE RECOVERY SITES IMPLEMENTING SYNCHRONOUS REMOTE MIRRORING

BACKGROUND

The present invention relates to data storage systems, and more specifically, this invention relates to the management and transfer of data between sites in a data storage system.

In an effort to maintain retention of data stored at a primary storage location, one or more redundant copies of the data are maintained at secondary (or "backup") storage locations. The secondary storage locations are typically removed from the primary storage location (at least to some extent), thereby effectively insulating each copy of data from experiencing any issues which may arise at a different one of the storage locations. For example, physically separating each of the storage locations from each other decreases the risk of more than one of the storage locations being affected by a same disaster event, e.g., such as a power loss.

Although separating the different storage locations from each other improves data retention, it also introduces strain to the communication channels connecting the storage locations. For instance, data stored at the primary storage location is continually being updated, deleted, added to, etc. These changes which occur to the data stored at the primary storage location are replicated at the secondary storage locations such that the redundant copies of the data accurately reflect the data stored at the primary storage location. Moreover, significant amounts of data, commands, authorization codes, etc. are exchanged between the different storage locations in response to experiencing a disaster event at one or more of the storage locations.

SUMMARY

A computer-implemented method, according to one embodiment, includes: detecting an outage at a production site, and transferring input/output (I/O) functionality to a first recovery site. In response to determining that the outage at the production site has been resolved, a first out-of-sync bitmap is received from the first recovery site. A second out-of-sync bitmap is also received from a second recovery site. The second recovery site serves as a synchronous mirrored copy to the first recovery site. Accordingly, the first and second out-of-sync bitmaps are merged together. Performance data which corresponds to achievable throughput is further received from each of the first and second recovery sites to the production site. The performance data is used to divide the merged out-of-sync bitmap into two portions. The merged out-of-sync bitmap is divided such that a size of a first of the two portions correlates to the achievable throughput from the first recovery site to the production site, while a size of a second of the two portions correlates to the achievable throughput from the second recovery site to the production site. A request is sent to the first recovery site for data which corresponds to the first portion of the merged out-of-sync bitmap. Similarly, a request is sent to the second recovery site for data which corresponds to the second portion of the merged out-of-sync bitmap. Finally, data is received which corresponds to the first and second portions of the merged out-of-sync bitmap respectively, in parallel.

A computer program product, according to another embodiment, includes a computer readable storage medium having program instructions embodied therewith. The program instructions are readable and/or executable by a processor to cause the processor to: perform the foregoing method.

A system, according to yet another embodiment, includes: a processor, and logic integrated with the processor, executable by the processor, or integrated with and executable by the processor. The logic is also configured to: perform the foregoing method.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for efficiently recovering data in parallel from different recovery sites using multiple target synchronous remote mirroring. This significantly increases the speed by which a data synchronization process can be completed following a disaster situation. For instance, determining which portion of data each recovery site will restore by calculating an initial bitmap division schema according to performance parameters of each synchronous remote mirroring pair, performance delay is minimized. Performance can be even further improved by dynamically adjusting the bitmap division schema to adapt to changes in achievable throughput between the production site and each of the respective recovery sites, e.g., as will be described in further detail below.

In one general embodiment, a computer-implemented method includes: detecting an outage at a production site, and transferring input/output (I/O) functionality to a first recovery site. In response to determining that the outage at the production site has been resolved, a first out-of-sync bitmap is received from the first recovery site. A second out-of-sync bitmap is also received from a second recovery site. The second recovery site serves as a synchronous mirrored copy to the first recovery site. Accordingly, the first and second out-of-sync bitmaps are merged together. Performance data which corresponds to achievable throughput is further received from each of the first and second recovery sites to the production site. The performance data is used to divide the merged out-of-sync bitmap into two portions. The merged out-of-sync bitmap is divided such that a size of a first of the two portions correlates to the achievable throughput from the first recovery site to the production site, while a size of a second of the two portions correlates to the achievable throughput from the second recovery site to the production site. A request is sent to the first recovery site for data which corresponds to the first portion of the merged out-of-sync bitmap. Similarly, a request is sent to the second recovery site for data which corresponds to the second portion of the merged out-of-sync bitmap. Finally, data is received which corresponds to the first and second portions of the merged out-of-sync bitmap respectively, in parallel.

In another general embodiment, a computer program product includes a computer readable storage medium having program instructions embodied therewith. The program instructions are readable and/or executable by a processor to cause the processor to: perform the foregoing method.

In yet another general embodiment, a system includes: a processor, and logic integrated with the processor, executable by the processor, or integrated with and executable by the processor. The logic is also configured to: perform the foregoing method.

Figure 1:
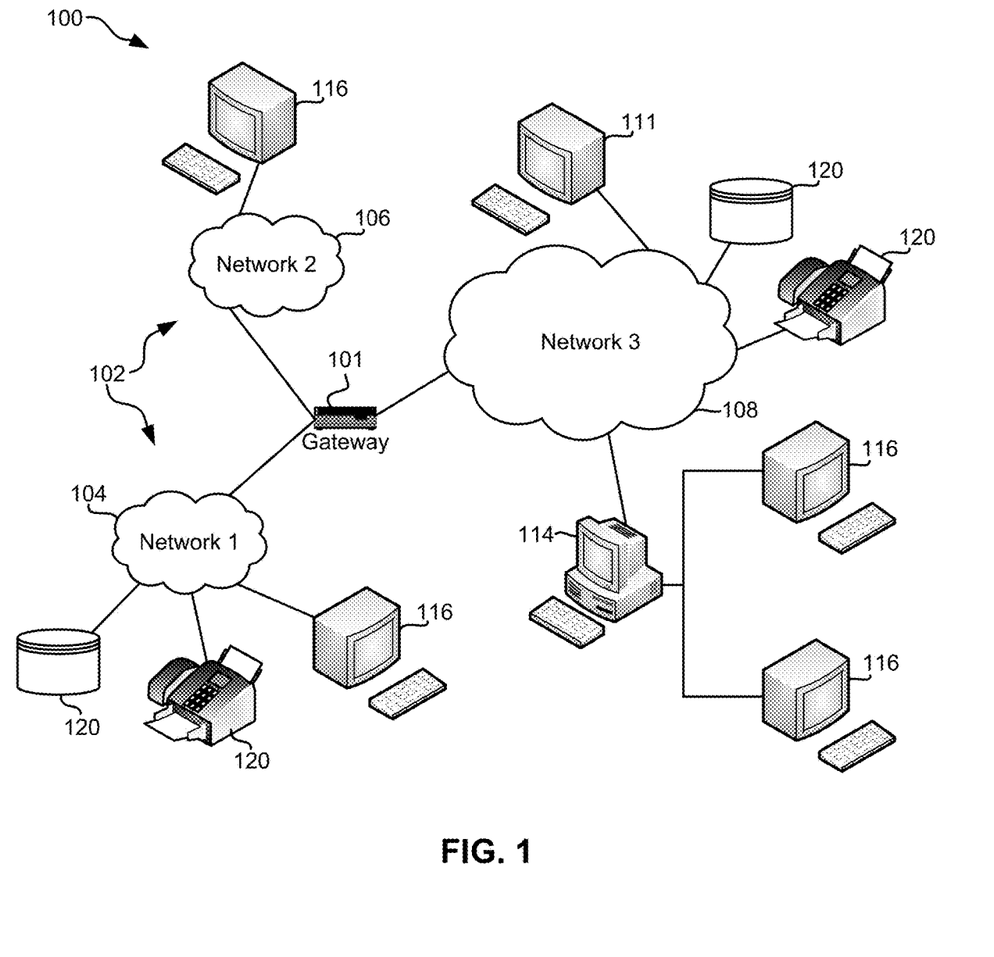
FIG. 1 is a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
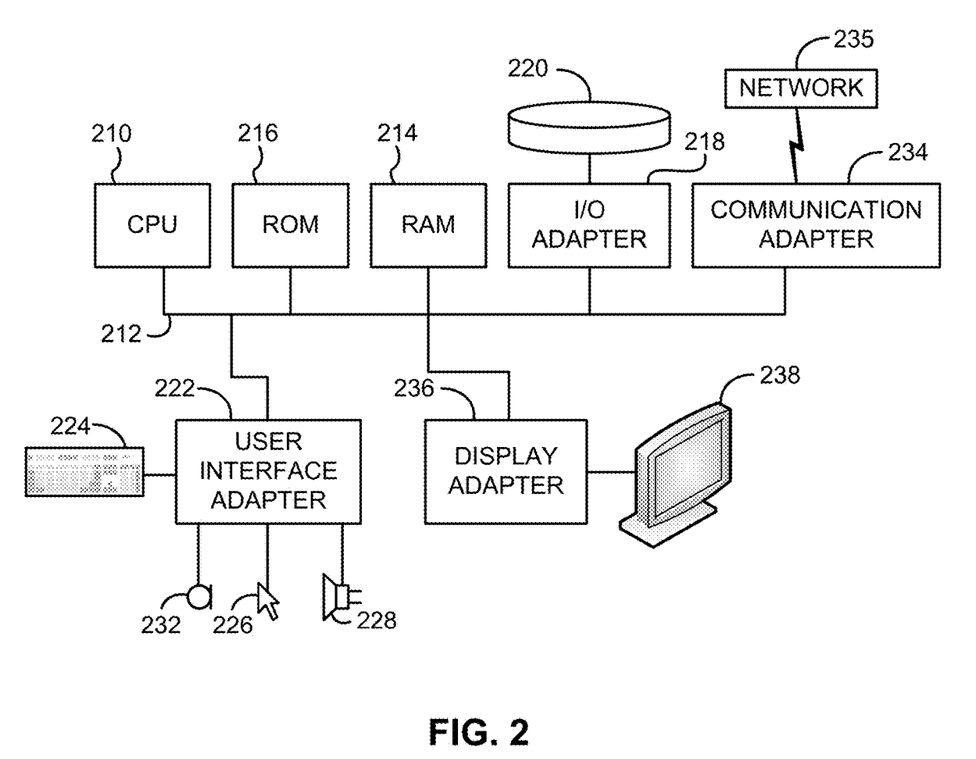
FIG. 2 is a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
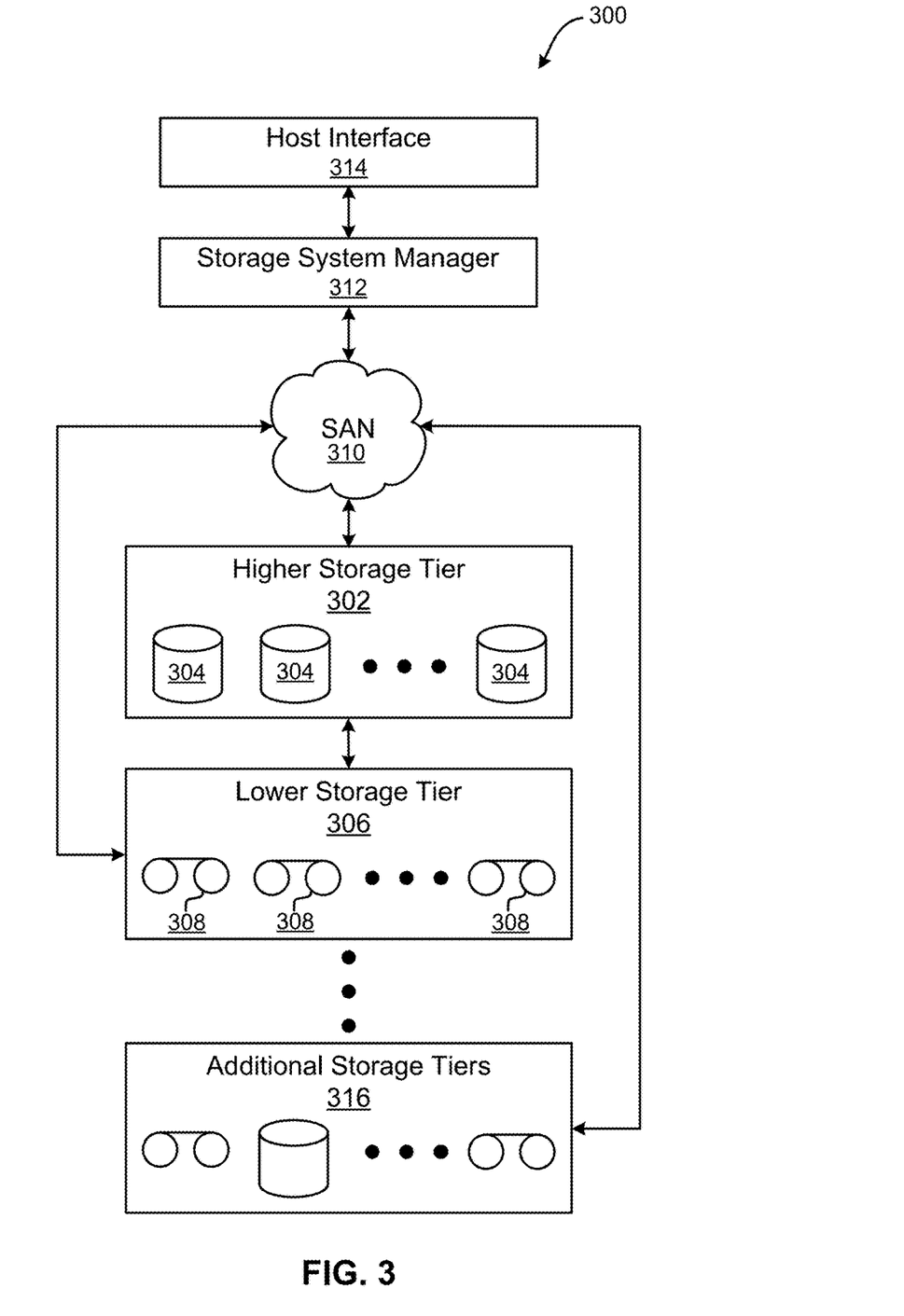
FIG. 3 is a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As mentioned above, in an effort to maintain retention of data stored at a primary storage location, one or more redundant copies of the data are maintained at secondary storage locations. The secondary storage locations are typically removed from the primary storage location (at least to some extent), thereby effectively insulating each copy of data from experiencing any issues which may arise at a different one of the storage locations. For example, physically separating each of the storage locations from each other decreases the risk of more than one of the storage locations being affected by a same disaster event, e.g., such as a power loss.

Although separating the different storage locations from each other improves data retention, it also introduces strain to the communication channels connecting the storage locations. For instance, data stored at the primary storage location is continually being updated, deleted, added to, etc. These changes which occur to the data stored at the primary storage location are replicated at the secondary storage locations such that the redundant copies of the data accurately reflect the data stored at the primary storage location. Additionally, data restorations performed at a production site using data stored at recovery sites are performed over long periods of time, especially for initial copy scenarios, thereby delaying the availability of duplicate protection for data stored in the system. This added strain and performance delays have been particularly problematic for conventional systems which have been unable to efficiently replicate data operations and maintain updated copies of data among the different storage locations as a result.

In sharp contrast to the foregoing shortcomings experienced by conventional systems, various ones of the embodiments included herein are able to adjust the manner by which data at a primary storage location is synchronized at one or more secondary storage locations. Some of the embodiments included herein are also able to implement recovery procedures across more than one secondary storage location in parallel. Furthermore, performance characteristics of the more than one secondary storage location are analyzed and used to make dynamic adjustments to the recovery procedures such that they are completed substantially simultaneously. As a result, data retention, sustained system operation, operating efficiency, etc. are significantly improved, e.g., as will be described in further detail below.

Figure 4:
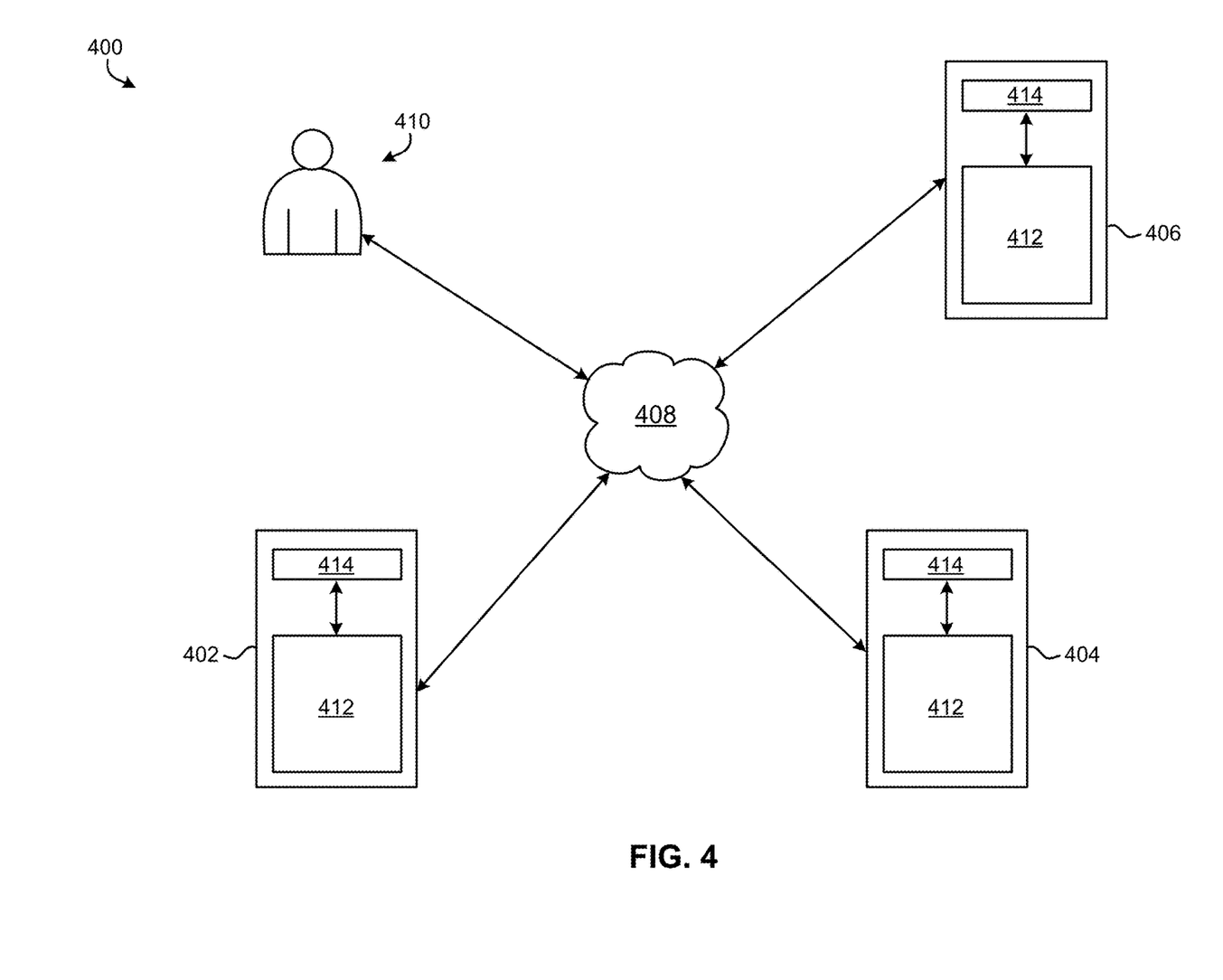
FIG. 4 is a representational view of a distributed storage system in accordance with one embodiment.

Looking to FIG. 4, a distributed data storage system 400 is illustrated in accordance with one embodiment. As an option, the present data storage system 400 may be implemented in conjunction with features from any other embodiment listed herein, such as those described with reference to the other FIGS. However, such data storage system 400 and others presented herein may be used in various applications and/or in permutations which may or may not be specifically described in the illustrative embodiments listed herein. Further, the data storage system 400 presented herein may be used in any desired environment. Thus FIG. 4 (and the other FIGS.) may be deemed to include any possible permutation.

As shown, the data storage system 400 includes a first storage location 402, a second storage location 404, and a third storage location 406, each of which are connected to each other by a network 408. A user 410 is also depicted as being connected to the network 408, e.g., using a mobile device, a personal computer, a service terminal, etc. The user 410 is thereby able to read data from and/or write data to any of the storage locations in the data storage system 400. Moreover, the type of user 410 connected to the network 408 varies depending on the desired approach. For instance, the user 410 may be a host, one or more servers, one or more controllers, an administrator, etc.

Each of the storage locations 402, 404, 406 each include data storage components 412 (e.g., memory) of any desired type, such as HDDs, SSDs, magnetic tape, etc. Moreover, a controller (e.g., processor) 414 is included in each of the storage locations 402, 404, 406, each of the controllers 414 being electrically coupled to the respective storage components 412. The controllers 414 may also be able to communicate with each other (e.g., send data, commands, requests, etc. to each other) using a connection to network 408.

The network 408 connecting the user 410 and storage locations 402, 404, 406 may be a WAN according to some approaches. However, the network 408 may include any desired type of network, e.g., such as a LAN, a SAN, a personal area network (PAN), etc., e.g., depending on the approach. For instance, the type of network 408 used to connect the user 410 and storage locations 402, 404, 406 may depend on the distance separating the each of the storage locations 402, 404, 406, as the user 410 and storage locations 402, 404, 406 may be geographically separated from each other by any amount of distance.

According to some approaches, the first storage location 402 serves as a primary storage location which receives and satisfies data operations (e.g., read requests, write commands, deletion instructions, etc.) received from the user 410, or elsewhere. Thus, the data stored at the first storage location 402 is regularly updated, appended to, deleted, etc. while the data storage system 400 is operational. The second and third storage locations 404, 406 further serve as secondary storage locations, each of which maintain a redundant copy of at least a portion of the data stored at the first storage location 402.

As the data stored at the first storage location 402 is updated over time, these updates are transmitted to the second and/or third storage locations 404, 406 such that the data stored at each of the second and third storage locations 404, 406 mirrors the corresponding data stored at the first storage location 402. This desirably provides the system 400 the ability to maintain operation despite experiencing a disaster situation at the first storage location 402, as one or more of the secondary storage locations may assume the role of satisfying data requests received from users, running applications, other storage systems, etc. Similarly, data retention is significantly improved by maintaining at least one redundant and updated copy of the data stored at the first storage location 402. Accordingly, the first storage location 402 (or primary storage location) is also referred to herein as being a "production site", while the second and third storage locations 404, 406 (or secondary storage locations) are also referred to herein as "recovery sites".

Figure 5A:
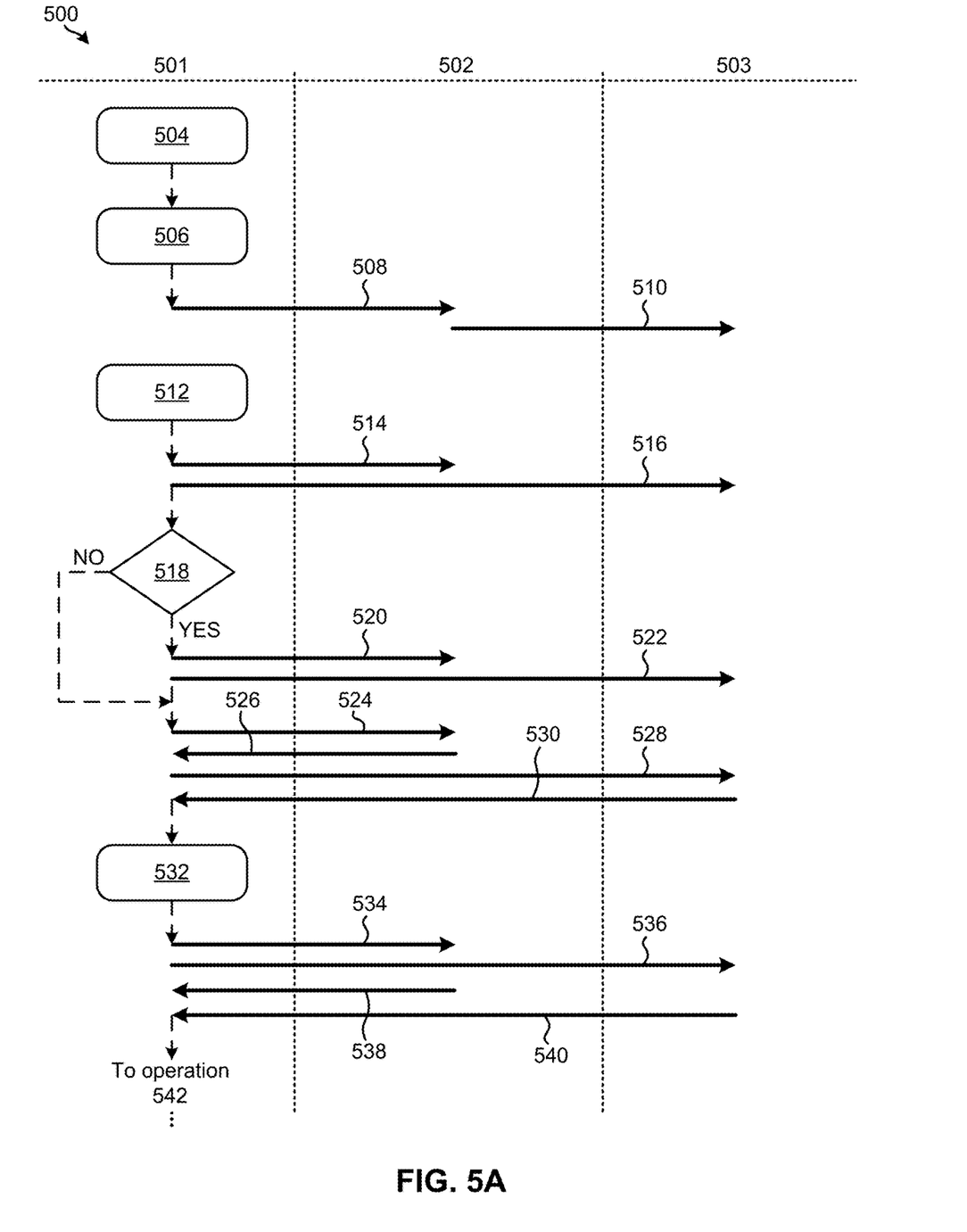
FIG. 5A is a flowchart of a method in accordance with one embodiment.

Now referring to FIG. 5A, a flowchart of a computer-implemented method 500 for performing data recovery in a distributed storage system is shown according to one embodiment. The method 500 may be performed in accordance with the present invention in any of the environments depicted in FIGS. 1-4, among others, in various embodiments. Of course, more or less operations than those specifically described in FIG. 5A may be included in method 500, as would be understood by one of skill in the art upon reading the present descriptions.

Each of the steps of the method 500 may be performed by any suitable component of the operating environment. For example, each of the nodes 501, 502, 503 shown in the flowchart of method 500 may correspond to one or more processors positioned at a different location in a distributed data storage system. Moreover, each of the one or more processors are preferably configured to communicate with each other.

In various embodiments, the method 500 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As mentioned above, FIG. 5A includes different nodes 501, 502, 503, each of which represent one or more processors, controllers, computer, etc., positioned at a different location in a distributed data storage system. For instance, node 501 may include one or more processors which are electrically coupled to the production site of a distributed data storage system (e.g., see controller 414 in first storage location 402 of FIG. 4 above). Moreover, node 502 may include one or more processors which are electrically coupled to the recovery site of a distributed data storage system (e.g., see controller 414 in second storage location 404 of FIG. 4 above), and node 503 may include one or more processors which are electrically coupled to another recovery site of a distributed data storage system (e.g., see controller 414 in third storage location 406 of FIG. 4 above).

Nodes 501, 502, 503 are preferably able to communicate with each other through a network. Accordingly, commands, data, requests, etc. may be sent between each of the nodes 501, 502, 503 depending on the approach. Moreover, it should be noted that the various processes included in method 500 are in no way intended to be limiting, e.g., as would be appreciated by one skilled in the art after reading the present description. For instance, data sent from node 501 to node 502 may be prefaced by a request sent from node 502 to node 501 in some approaches.

As shown, operation 504 of method 500 is performed at node 501 and includes detecting an outage at the production site. The type and severity of the outage experienced at the production site varies depending on the approach. For instance, in some approaches the production site may experience an unplanned outage (e.g., a failure event), such as a power outage which causes the production site to go offline, a software crash which also causes the production site to go offline, yet while maintaining communication with other portions of the overall system, etc. However, in other approaches the production site experiences planned outages which intentionally cause the production site to go offline. For example, a planned outage of the production site may correspond to a maintenance operation, a system diagnostics exam, direct user input, etc. It follows that the outage detected in operation 504 may correspond to planned and/or unplanned events.

The manner in which the outage at the production site is detected also varies depending on the approach. For instance, in some approaches the outage is detected by a processor coupled thereto in response to receiving a warning, detecting the absence of a reply to a request, identifying a change to system parameters, etc.

In response to detecting the outage at the production site, operation 506 includes performing a failover operation, while operation 508 includes transferring I/O functionality to a first recovery site. Transferring I/O functionality to the first recovery site effectively causes the first recovery site to serve as a production site, at least temporarily. Thus, operations, requests, instructions, etc. are received and satisfied by the first recovery site (now acting as a stand-in production site) as they are received.

Similarly, operation 510 includes transferring recovery functionality to a second recovery site, preferably such that data activity performed at the acting production site is replicated at the second recovery site (now acting as a stand-in recovery site). According to a specific approach, which is in no way intended to limit the invention, the second recovery site serves as a synchronous mirrored copy to the first recovery site (now acting as a stand-in production site) following the outage at the actual production site.

It follows that although the actual production site at node 501 may be offline as a result of the outage event, the stand-in production site at node 502 and the stand-in recovery site at node 503 are able to maintain operation of the overall storage system. The storage system thereby remains online while attempting to resolve the outage at the actual production site of node 501, and is able to remain in such a state for a prolonged period of time.

In response to determining that the outage has been resolved and that the actual production site is operational again, the actual production site at node 501 is brought back online in operation 512. As mentioned above, the outage may correspond to planned and/or unplanned events. Accordingly, the outage may be resolved in response to remedying an issue experienced at the production site in some approaches, while in others the outage may be resolved simply by completing a planned event, e.g., as would be appreciated by one skilled in the art after reading the present description. A remainder of the sites are also informed accordingly in operations 514, 516. Decision 518 further includes determining whether any data loss occurred as a result of the outage at the production site. The determination made in decision 518 is preferably made with respect to the data that is actually stored at the production site of node 501, but may incorporate data stored at other locations in some approaches.

In response to determining that data loss did occur as a result of the outage at the production site, method 500 proceeds to operations 520, 522 which include sending a data loss bitmap to each of the first and second recovery sites at nodes 502 and 503 respectively. The data loss bitmap sent to the recovery sites may actually specify the portions of data which have been lost and/or reflect the current state of the data stored at the production site. Moreover, the type of bitmap used to form the data loss bitmap(s) may be of any type which would be apparent to one skilled in the art after reading the present description.

From operation 522, the flowchart proceeds to operation 524 as shown. Method 500 also jumps to operation 524 from decision 518 in response to determining that data loss did not occur as a result of the outage at the production site. There, operation 524 includes sending a request to the first recovery site at node 502 (currently acting as the stand-in production site) for a first out-of-sync bitmap therefrom, and operation 526 includes receiving the requested first out-of-sync bitmap. Similarly, operation 528 includes sending a request to the second recovery site at node 503 (currently acting as the stand-in recovery site) for a second out-of-sync bitmap therefrom, and operation 530 includes receiving the requested second out-of-sync bitmap.

An out-of-sync bitmap is used in data synchronization environments to identify data which has actually been changed. While the out-of-sync bitmap typically does not include any of the actual data, it can be used to identify which data is involved with selectively update a given file, rather than having to rewrite the entire file. Thus, out-of-sync bitmaps significantly increase the efficiency by which the data at the production site of node 501 can be repaired following the outage event. It should also be noted that in some approaches the out-of-sync bitmaps received from the first and/or second recovery sites at nodes 502 and 503 respectively are formed using the data loss bitmap. For instance, in approaches where data loss bitmaps are sent to the first and/or second recovery sites at nodes 502 and 503 respectively (e.g., see operations 520, 522 above), the out-of-sync bitmaps may be formed using the data loss bitmap, at least to some extent. Thus, a portion of data indicated as having been lost at the production site may be included in an out-of-sync bitmap despite not having been actually updated, e.g., as would be appreciated by one skilled in the art after reading the present description.

Referring still to FIG. 5A, operation 532 includes merging the first and second out-of-sync bitmaps. In some approaches the first and second out-of-sync bitmaps are merged by comparing the entries in the two bitmaps, and deduplicating any repeat entries while preserving each unique entry therein. However, the two out-of-sync bitmaps may be merged using any processes which would be apparent to one skilled in the art after reading the present description.

A request for performance data is also sent to each of the first and/or second recovery sites at nodes 502 and 503. See operations 534, 536 respectively. In some approaches one or both of the requests may specify the type of performance data which is desired, while in other approaches one or both of the requests may simply request whatever performance data is available. An illustrative list of performance data which may be specifically requested, received and/or used herein includes, but is in no way limited to, data granularity, operation response times, distance between sites, a number of data paths between sites, data throughput, etc. It follows that the performance data preferably corresponds to, or at least may be used to predict, the achievable data throughput from each of the first and second recovery sites at nodes 502, 503 to the production site at node 501, respectively. As such, the performance data is used in preferred approaches to efficiently manage the manner by which the first and second recovery sites are used to restore the production site, e.g., as will soon become apparent.

As shown, operations 538 and 540 include actually receiving the performance data from each of the first and second recovery sites respectively. Moreover, operation 542 includes using the performance data to divide the merged out-of-sync bitmap into two portions. The size of each of the two portions preferably corresponds to a relative capacity by which data may be transitioned from one of the recovery sites to the production site. In other words, a size of a first of the two portions preferably correlates to the achievable throughput from the first recovery site to the production site, while a size of a second of the two portions correlates to the achievable throughput from the second recovery site to the production site. Dividing the merged out-of-sync bitmap in this manner optimizes the manner by which the available throughputs are utilized in a zero-sum game manner. As a result, the data which corresponds to the first and second portions of the merged out-of-sync bitmap is fully received in substantially the same amount of time, e.g., as will be described in further detail below. This desirably minimizes the amount of time involved with restoring the primary site following a disaster event while also reducing the amount of strain placed on the network, improving the efficiency by which system resources are consumed, etc.

With continued reference to FIG. 5A, operation 544 includes sending a request to the first recovery site for the first portion of the merged out-of-sync bitmap. In other words, operation 544 includes sending a request to the first recovery site (currently acting as the stand-in production site) at node 502 for a portion of the merged out-of-sync bitmap determined as corresponding to the amount of throughput predicted as being achievable from the first recovery site to the production site. Similarly, operation 546 includes sending a request to the second recovery site for the second portion of the merged out-of-sync bitmap. In other words, operation 546 includes sending a request to the second recovery site (currently acting as the stand-in recovery site) at node 503 for a portion of the merged out-of-sync bitmap determined as corresponding to the amount of throughput predicted as being achievable from the second recovery site to the production site.

Operations 548 and 550 further include receiving the data which corresponds to the first and second portions of the merged out-of-sync bitmap from the first and second recovery sites respectively, in parallel. In addition to being received in parallel, because the merged out-of-sync bitmap is divided into two portions, each of which correlate to the achievable throughput used to actually conduct the transfer of information, the data which corresponds to the first and second portions of the merged out-of-sync bitmap is fully received from the first and second recovery sites in substantially the same amount of time. Again, a total amount of time spent receiving the data corresponding to the first and second portions of the merged out-of-sync bitmap is reduced in comparison to any other arbitrary division of the out-of-sync bitmaps by using the performance data to divide the merged out-of-sync bitmap into the two portions.

Figure 5B:
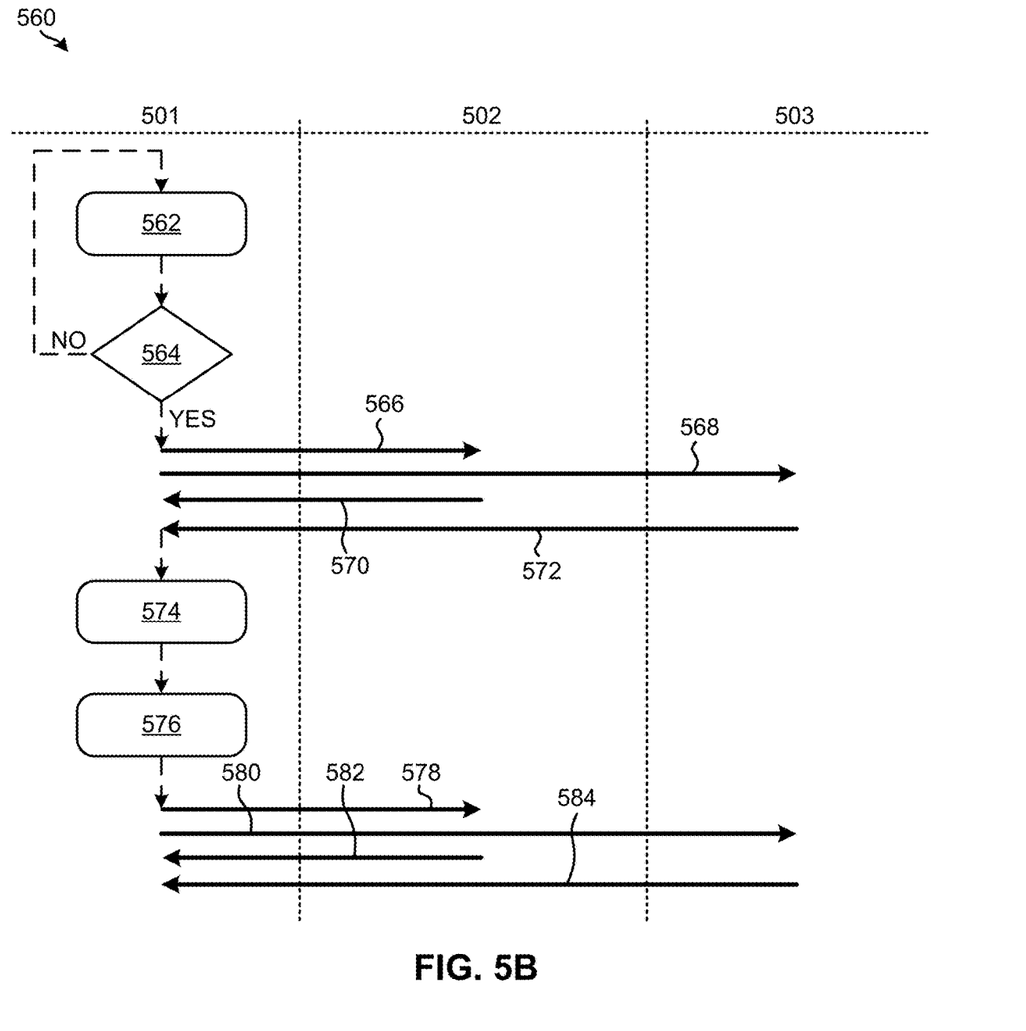
FIG. 5B is a flowchart of sub-processes for one of the operations in the method of FIG. 5A, in accordance with one embodiment.

However, in some situations the actual performance of the storage sites and/or the network connections extending therebetween varies from the previously received performance data. As a result, the throughputs thought to be achievable, and consequentially the division of the merged out-of-sync bitmap made using these throughputs, may not accurately reflect actual system performance capabilities as time progresses. In order to counteract this type of situation, the actual performance of the recovery sites and/or the network paths from each of the first and second recovery sites to the production site is preferably monitored. Looking to FIG. 5B, exemplary processes of performing a performance regulation method 560 are illustrated in accordance with one embodiment. The processes included in the performance regulation method 560 may be used to monitor actual performance while the data which corresponds to the first and second portions of the merged out-of-sync bitmap is being transferred from the first and second recovery sites to the production site are illustrated in accordance with one embodiment. It follows that the processes included in the method 560 of FIG. 5B may be performed in parallel to certain operations of FIG. 5A above, e.g., such as operations 548 and 550. However, it should be noted that the sub-processes of FIG. 5B are illustrated in accordance with one embodiment which is in no way intended to limit the invention.

As shown, the flowchart of method 560 includes monitoring performance at the various nodes 501, 502, 503 and/or the connections extending therebetween. See operation 562. In some approaches, operation 562 includes monitoring the actual performance which corresponds to the performance data received in operations 538 and 540. In other words, operation 562 includes monitoring performance which actually corresponds to, or at least may be used to predict, the achievable data throughput from each of the first and second recovery sites at nodes 502, 503 to the production site at node 501, respectively. However, any desired type of performance can be monitored in operation 562.

The monitoring performed in operation 562 is preferably performed in the background and in parallel to normal operation of the distributed data storage system. This allows the monitoring in operation 562 to be performed continually and without interrupting normal operation of the system, e.g., as would be appreciated by one skilled in the art after reading the present description.

In addition to monitoring the performance, decision 564 includes determining whether the actual performance and the performance data used to divide the merged out-of-sync bitmap into the two portions has exceeded a predefined threshold. In other words, decision 564 determines whether actual performance is sufficiently similar to the previously received performance data. In situations where the performance data used to divide the merged out-of-sync bitmap into the two portions does not match the actual performance experienced during use, action is taken in order to ensure that the data which corresponds to the first and second portions of the merged out-of-sync bitmap is fully received from the first and second recovery sites in substantially the same amount of time. Again, a total amount of time spent receiving the data corresponding to the first and second portions of the merged out-of-sync bitmap is reduced in comparison to any other arbitrary division of the out-of-sync bitmaps by using the performance data to divide the merged out-of-sync bitmap into the two portions. However, in situations where the actual performance does not match the performance data used to make the division, adjustments are preferably made.

It follows that the flowchart of method 560 returns to operation 562 in response to determining that the actual performance is sufficiently similar to the performance data used to divide the merged out-of-sync bitmap into the two portions. Method 560 is thereby able to continue monitoring actual performance. However, the flowchart proceeds to operations 566 and 568 in response to determining that the actual performance and the performance data used to divide the merged out-of-sync bitmap into the two portions has exceeded the predefined threshold. The threshold difference between the actual performance and the performance data used to divide the merged out-of-sync bitmap may be predetermined by an administrator based on system settings, based on industry standards, using previous performance, etc. depending on the desired approach. Moreover, as noted above, "above a threshold" is in no way intended to limit the invention. Rather than determining whether a value is above a threshold, equivalent determinations may be made, e.g., as to whether a value is within a predetermined range, whether a value is outside a predetermined range, whether an absolute value is above a threshold, whether a value is below a threshold, etc., depending on the desired approach.

As shown, operation 566 includes sending a request to the first recovery site for an updated version of the first out-of-sync bitmap, while operation 568 includes sending a request to the second recovery site for an updated version of the second out-of-sync bitmap. The updated versions of the first and second out-of-sync bitmaps provide information which corresponds to how data is being transferred to the production site from each of the recovery sites respectively. Accordingly, in response to receiving the updated versions of the first and second out-of-sync bitmaps (see operations 570, 572), operation 574 of method 560 further includes merging the updated first and second out-of-sync bitmaps.

In operation 576, the actual performance is used to divide the updated merged out-of-sync bitmap into two updated portions. Again, the size of each portion of the updated merged out-of-sync bitmap preferably corresponds to the throughput experienced from the respective one of the recovery sites to the production site. Thus, a size of a first of the two updated portions correlates to actual throughput experienced from the first recovery site to the production site, while a size of a second of the two updated portions correlates to actual throughput experienced between the production site and the second recovery site. Dividing the updated merged out-of-sync bitmap in this manner allows for a total amount of time spent receiving the first and second updated portions of the updated merged out-of-sync bitmap to be reduced in comparison to any other arbitrary division of the out-of-sync bitmaps. As mentioned above, this is achieved by using the actual performance to divide the updated merged out-of-sync bitmap into the two updated portions, thereby accurately utilizing the available throughputs.

Moving to operations 578 and 580, requests are sent to the first and second recovery sites for the data corresponding to the first and second updated portions of the updated merged out-of-sync bitmap, respectively. Furthermore, operations 582 and 584 include receiving the data which corresponds to the first and second updated portions of the updated merged out-of-sync bitmap from the first and second recovery sites respectively. The data is also received from the first and second recovery sites in parallel.

Again, because the updated merged out-of-sync bitmap is divided into two portions, each of which correlate to the achievable throughput used to actually conduct the transfer of information, the data which corresponds to the first and second updated portions of the updated merged out-of-sync bitmap is fully received from the first and second recovery sites in substantially the same amount of time. In fact, the total amount of time spent receiving the data corresponding to the updated first and second portions of the updated merged out-of-sync bitmap is reduced in comparison to any other arbitrary division of the updated out-of-sync bitmaps by using the actual performance data to divide the updated merged out-of-sync bitmap into the two updated portions.

As mentioned above, various ones of the operations included in method 560 are performed in parallel with those of method 500, e.g., as part of a background operation. However, the manner in which method 560 progresses causes the performance of method 500 to pause in some approaches. For instance, one or more of the operations depicted in FIG. 5A may be paused in response to determining that the actual performance and the performance data differ by an undesirable amount. The operations included in method 560 are typically implemented to transfer a remainder of the data to the production site, and may be repeated any number of times to ensure that data is being received from each of the recovery sites in an efficient manner, e.g., according to the various approaches herein.

It follows that various ones of the approaches included herein are able to successfully and efficiently recover the data in parallel from different recovery sites using multiple target synchronous remote mirroring to increase the speed by which the data synchronization process is performed. This is particularly desirable in disaster recovery situations. Specifically, in some approaches by determining which portion of data each recovery site will restore by calculating the initial bitmap division schema according to the performance parameters of each synchronous remote mirroring pair, performance delay is minimized. Performance can be even further improved by dynamically adjusting the bitmap division schema to adapt to changes in achievable throughput from each of the respective recovery sites to the production site, e.g., as described above.

However, the flow of method 500 and/or method 560 may be interrupted in a number of situations, thereby changing how recovery of the production site is completed. For instance, in some instances the production site goes back offline during the recovery process, thereby causing the recovery procedure to terminate, e.g., until the production site can be repaired again. In response to the production site being repaired and brought back online, method 500 and/or method 560 may be reinitiated. In other approaches one of the recovery sites may experience an outage event during the recovery process, whereby the remainder of the recovery sites are used to complete a remainder of the data recovery. In some instances, synchronous remote mirroring functionality and a failover of host I/O functionality is made between the recovery sites.

In still other approaches, the actual communication path extending between the production site and one or more of the recovery sites may fail. In these situations, the remainder of the communication paths are used to complete a remainder of the data recovery. The communication path extending between the recovery sites may also fail in some situations, whereby one of the recovery sites is used to complete a remainder of the data recovery with the production site. In some approaches a read error (e.g., media error) occurs during the recovery process at a recovery site. The recovery site which experienced the read error responds by informing the production site, which may in turn request the data corresponding to the read error from another one of the recovery sites.

Referring now to an illustrative in-use example, which is in no way intended to limit the invention, the process of performing a data restoration in a synchronous remote mirroring environment following an outage at the production site thereof is presented. In the present in-use example, the production site "H1" is able to communicate with a host, in addition to a first recovery site "H2" and a second recovery site "H3". Moreover, the production site, the first recovery site, and the second recovery site are part of a distributed data storage system. Thus, data, commands, instructions, bitmaps, etc., may be sent to and/or received from any of the sites in the distributed data storage system and the host.

As mentioned above, the in-use example incorporates an outage event at the production site H1. Thus, following the outage event at H1, a failover operation is performed in which synchronous remote mirroring is performed from H1 to H2. Additionally, host I/O responsibilities are transitioned from H1 to H2. The outage event experienced at H1 results from an intended action (e.g., a planned service operation) in some approaches, while in other approaches the outage event results from an unintended disaster situation. Disaster situations typically involve data loss, loss of access, etc., and therefore appropriate action is preferably taken.

Following the outage event, synchronous remote mirroring is resumed from H2 to H3 with incremental resynchronization. Thus, H2 acts as the production site while H3 acts as the recovery site e.g., as would be appreciated by one skilled in the art after reading the present description.

Service operations are performed on H1 in an attempt to remedy the outage event experienced there, and bring H1 back online in order to restore data thereon. In response to bringing H1 back online, communication paths from H1 to each of H2 and H3 are established respectively. According to some approaches, these communication paths are established by reforming network paths therebetween using any conventional approach which would be apparent to one skilled in the art after reading the present description. For example, in some approaches a processor at H1 sends one or more path establishing commands to H2 and/or H3, respectively. H2 and/or H3 are each thereby able to establish a communication path to H1.

As mentioned above, unplanned outage events at the production site sometimes result in data loss, e.g., such as missing data, data integrity failures, checksum errors, etc. For situations involving data loss, H1 sends a bitmap which identifies these data losses (e.g., a "data loss bitmap") to H2 and/or H3. In response to receiving this data loss bitmap, H2 and/or H3 merge the bitmap with their current out-of-synchronization bitmaps. The out-of-synchronization bitmaps for H2 and H3 should be essentially the same (e.g., identical) because the bitmaps are part of a synchronous mirrored copy. It follows that in situations where the bitmaps for H2 and H3 are not the same, the present recovery procedure may be terminated and a standard data restoration process may alternatively be initiated.

Returning to the present in-use example, H1 requests, and subsequently receives an out-of-synchronization bitmap from each of H2 and H3. Although some approaches involve receiving an out-of-synchronization bitmap from H2 and/or H3 which also includes a data loss bitmap, in other approaches either of the out-of-synchronization bitmaps may not include a data loss bitmap merged therewith, e.g., as described above.

H1 also retrieves performance data from H2 and H3. The performance data preferably corresponds to, or at least may be used to predict, the achievable data throughput from each of H2 and H3 to H1, respectively. For instance, the performance data may include a number of the synchronous mirrored copy paths, the bandwidth of each of the physical links, distances between each of the sites, workloads of the recovery sites, response times between the production site and each of the recovery sites obtained from a synchronous mirrored copy, etc. As such, the performance data is used in some approaches to efficiently manage the manner by which H2 and H3 are used to restore H1. For instance, the performance data is used to calculate the throughput of synchronous remote mirroring from H2 to H1 and from H3 to H1.

The out-of-synchronization bitmap is also used in some approaches to record the changed tracks between the recovery site H2 and production site H1, and between the recovery site H3 and production site H1. Each bit of the bitmap is associated with one track of the primary volume and its peer track of the secondary volume. Thus, the out-of-synchronization bitmaps of each of the recovery sites may be used to determine which portions of the backup data have been updated at the recovery sites, and not yet restored to the production site. In response to these situations, the data of the production site may be updated accordingly during the restoration.

The bitmaps received from H2 and H3 are thereafter divided into two portions, each of which correspond to the calculated throughputs. For instance, some approaches include dividing the bitmaps into two parts according to a ratio of the synchronous remote mirroring throughputs calculated. As a result, the data restoration performed from each of H2 and H3 finishes at substantially the same time, which results in an overall restoration procedure which consumes the least amount of overall time.

Information describing this schema by which the bitmaps are to be divided is sent to both H2 and H3. Accordingly, H2 and H3 each have a portion of the out-of-synchronization bitmap according to the division schema, and return to H1 the tracks which correspond to their respective portion of the bitmap. In response to receiving a track (e.g., portion of data) from either H2 or H3, H1 responds by sending an acknowledgement message to both H2 and H3. Accordingly, H2 and H3 update their respective out-of-synchronization bitmaps to indicate that the track corresponding to the acknowledgement message received has been recovered at H1.

Actual performance is preferably monitored during the recovery procedure in order to ensure that the throughput experienced from H2 and H3 respectively, to H1 matches the performance data originally received. In response to determining that the actual throughput experienced is sufficiently different from the performance data previously used to divide the merged out-of-sync bitmap, the division schema is preferably updated. Specifically, H1 retrieves the updated out-of-synchronization bitmaps from H2 and H3 in response to determining that the actual performance had deviated from the previously received performance data. These current out-of-synchronization bitmaps are merged and divided into two portions based on the actual performance, e.g., according to the ratio of current synchronous remote mirroring throughputs.

This updated bitmap division schema is thereafter sent to H2 and H3. Upon receiving the updated bitmap division schema, the ongoing synchronous remote mirroring procedure between H2 and H1, as well as H3 and H1 is suspended such that H2 and H3 are able to divide each of their out-of-synchronization bitmap according to the updated division schema. Thereafter, the synchronous remote mirroring between H2 and H1, as well as H3 and H1 is resumed according to the new schema. Furthermore, in order to achieve stability in performance of this synchronous remote mirroring procedure, the minimum time interval of the bitmap change is greater than or equal to a predefined threshold, e.g., as would be appreciated by one skilled in the art after reading the present description.

Once the data restoration from H2 and H3 to H1 has completed, a failover of the synchronous remote mirroring is preferably performed from H2 back to H1, and host I/O performance is also preferably transferred to H1. However, it should be noted that although the present in-use example only includes one production site and two recovery sites, the same or similar processes can be used to implement additional recovery sites.

In another in-use example, Equation 1, Equation 2 and/or Equation 3 below are used to determine the anticipated throughput achievable by a network path extending between a pair of sites in a distributed data storage system, e.g., such as between the production site and a given recovery site. Accordingly, results of Equation 1, Equation 2 and/or Equation 3 can be used to formulate an initial bitmap division schema as used herein. However, it should also be noted that some of the variables have been presented here with respect to an exemplary system having a production site H1 and two recovery sites H2 and H3, which is in no way intended to limit the invention.

$$\text{Throughput}_{Path} = \frac{\text{Data\_Granularity}}{\text{SYN\_Write\_Response\_Time}} \times \text{Command\_Parallel} \quad \text{Equation 1}$$

$$\text{Throughput}_{Pair} = \frac{\text{Data\_Granularity}}{\text{SYN\_Write\_Response\_Time}} \times \text{Command\_Parallel} \times \text{Path\_Number} \quad \text{Equation 2}$$

$$\frac{\text{Bitmap\_Size}_{H2-H1}}{\text{Bitmap\_Size}_{H3-H1}} = \frac{\text{Distance}_{H3-H1} \times \text{Path\_Number\_One\_Pair}_{H2-H1}}{\text{Distance}_{H2-H1} \times \text{Path\_Number\_One\_Pair}_{H3-H1}} \quad \text{Equation 3}$$

Here, "Data_Granularity" represents the size of the data sent from the primary volume to the secondary volume for one round, and "SYN_Write_Response_Time" represents the average time of one command sent from primary volume to secondary volume for one round. In other words, "SYN_Write_Response_Time" represents the round-trip amount of time from when the data is sent, to when an acknowledgement is received in response. Accordingly, the SYN_Write_Response_Time can be detected by the primary volume. "Command_Parallel" represents the number of parallel write commands sent at the same time for a synchronous mirrored copy operation, while "Path_Number" represents the number of data paths established for each synchronous mirrored copy pair.

"Path_Number_One_Pair$_{H2-H1}$" represents the number of paths established for each synchronous mirrored copy pair from the recovery site H2 to the production site H1, while "Path_Number_One_Pair$_{H3-H1}$" represents the number of paths established for each synchronous mirrored copy pair from the recovery site H3 to the production site H1. "Distance$_{H2-H1}$" represents the distance between the recovery site H2 to the production site H1, and "Distance$_{H3-H1}$" represents the distance between the recovery site H3 to the production site H1. Furthermore, "Throughput$_{Path}$" represents the throughput of the write commands for one synchronous mirrored copy path, and "Throughput$_{Pair}$" represents the throughput of the write commands for one synchronous mirrored copy pair. Accordingly, the Throughput$_{Pair}$ between H2 and H1 represents the throughput of the write commands for one synchronous mirrored copy pair from the recovery site H2 to the production site H1, while a Throughput$_{Pair}$ between H3 and H1 represents the throughput of the write commands for one synchronous mirrored copy pair from the recovery site H3 to the production site H1. Finally, "Bitmap_Size$_{H2-H1}$" represents the size of the portion of the bitmap assigned to recovery site H2, while "Bitmap_Size$_{H3-H1}$" represents the size of the portion of the bitmap assigned to recovery site H3.

Throughputs computed using Equation 1, Equation 2 and/or Equation 3 may further be used to construct the division schema used to divide a merged out-of-sync bitmap as described herein. For instance, bitmaps received from H2 and H3 are divided into two portions, each of which correspond to the achievable throughputs computed using Equation 1, Equation 2 and/or Equation 3. For instance, some approaches include dividing the bitmaps into two parts according to a ratio of the synchronous remote mirroring throughputs calculated. As a result, the data restoration performed from each of H2 and H3 finishes at substantially the same time, which results in an overall restoration procedure which consumes the least amount of overall time.

Again, various ones of the embodiments herein are able to utilize multiple recovery sites to increase the speed by which data recovery and/or synchronization processes are performed, particularly in systems which implement synchronous mirrored copying. This data recovery and/or synchronization is performed in parallel from the different recovery sites, and is structured based on site distances, link latency, number of communication paths, etc., in order to determine which portions of data each recovery site should be used to recover. Moreover, dynamic adjustments are made to the bitmap division schemas in order to adapt to changes in achievable throughput for the recovery synchronous remote mirroring pairs between the production site and each of the recovery sites, respectfully. As a result, the data restoration of each recovery synchronous remote mirroring pair is completed in substantially the same amount of time, thereby minimizing the total recovery time.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
    detecting an outage at a production site;
    transferring input/output (I/O) functionality to a first recovery site;
    in response to determining that the outage at the production site has been resolved, receiving a first out-of-sync bitmap from the first recovery site;
    receiving a second out-of-sync bitmap from a second recovery site, wherein the second recovery site serves as a synchronous mirrored copy to the first recovery site;
    merging the first and second out-of-sync bitmaps into a merged out-of-sync bitmap;
    receiving performance data which corresponds to achievable throughput from each of the first and second recovery sites to the production site;

using the performance data to divide the merged out-of-sync bitmap into two portions, wherein a size of a first of the two portions correlates to the achievable throughput from the first recovery site to the production site, wherein a size of a second of the two portions correlates to the achievable throughput from the second recovery site to the production site;

sending a request to the first recovery site for data which corresponds to the first portion of the merged out-of-sync bitmap;

sending a request to the second recovery site for data which corresponds to the second portion of the merged out-of-sync bitmap; and receiving the data which corresponds to the first and second portions of the merged out-of-sync bitmap respectively, in parallel.

2. The computer-implemented method of claim 1, wherein the data which corresponds to the first and second portions of the merged out-of-sync bitmap respectively, is fully received in substantially a same amount of time.

3. The computer-implemented method of claim 1, comprising:

detecting that a difference between actual performance and the performance data used to divide the merged out-of-sync bitmap into the two portions has exceeded a predefined threshold;

sending a request to the first recovery site for an updated version of the first out-of-sync bitmap;

sending a request to the second recovery site for an updated version of the second out-of-sync bitmap;

merging the updated first and second out-of-sync bitmaps into an updated merged out-of-sync bitmap;

using the actual performance to divide the updated merged out-of-sync bitmap into two updated portions, wherein a size of a first of the two updated portions correlates to actual throughput experienced from the first recovery site to the production site, wherein a size of a second of the two updated portions correlates to actual throughput experienced from the second recovery site to the production site;

sending a request to the first recovery site for data which corresponds to the first updated portion of the updated merged out-of-sync bitmap;

sending a request to the second recovery site for data which corresponds to the second updated portion of the updated merged out-of-sync bitmap; and receiving the data which corresponds to the first and second updated portions of the updated merged out-of-sync bitmap respectively, in parallel.

4. The computer-implemented method of claim 3, wherein the data which corresponds to the first and second updated portions of the updated merged out-of-sync bitmap respectively, are fully received in substantially a same amount of time.

5. The computer-implemented method of claim 3, wherein a total amount of time spent receiving the data which corresponds to the first and second updated portions of the updated merged out-of-sync bitmap is reduced by using the actual performance to divide the updated merged out-of-sync bitmap into the two updated portions.

6. The computer-implemented method of claim 1, wherein the performance data is selected from the group consisting of: data granularity, response time, distance between sites, a number of data paths between sites, and data throughput.

7. The computer-implemented method of claim 1, comprising:

sending a data loss bitmap to each of the first and second recovery sites, wherein the out-of-sync bitmaps received from the first and second recovery sites are formed using the data loss bitmap.

8. A computer program product comprising a computer readable storage medium having program instructions embodied therewith, the program instructions readable and/or executable by a processor to cause the processor to:

detect, by the processor, an outage at a production site;

transfer, by the processor, input/output (I/O) functionality to a first recovery site;

in response to determining that the outage at the production site has been resolved, receive, by the processor, a first out-of-sync bitmap from the first recovery site;

receive, by the processor, a second out-of-sync bitmap from a second recovery site, wherein the second recovery site serves as a synchronous mirrored copy to the first recovery site;

merge, by the processor, the first and second out-of-sync bitmaps into a merged out-of-sync bitmap;

receive, by the processor, performance data which corresponds to achievable throughput from each of the first and second recovery sites to the production site;

use, by the processor, the performance data to divide the merged out-of-sync bitmap into two portions, wherein a size of a first of the two portions correlates to the achievable throughput from the first recovery site to the production site, wherein a size of a second of the two portions correlates to the achievable throughput from the second recovery site to the production site;

send, by the processor, a request to the first recovery site for data which corresponds to the first portion of the merged out-of-sync bitmap;

send, by the processor, a request to the second recovery site for data which corresponds to the second portion of the merged out-of-sync bitmap; and receive, by the processor, the data which corresponds to the first and second portions of the merged out-of-sync bitmap respectively, in parallel.

9. The computer program product of claim 8, wherein the data which corresponds to the first and second portions of the merged out-of-sync bitmap respectively, is fully received in substantially a same amount of time.

10. The computer program product of claim 8, the program instructions readable and/or executable by the processor to cause the processor to:

detect, by the processor, that a difference between actual performance and the performance data used to divide the merged out-of-sync bitmap into the two portions has exceeded a predefined threshold;

send, by the processor, a request to the first recovery site for an updated version of the first out-of-sync bitmap;

send, by the processor, a request to the second recovery site for an updated version of the second out-of-sync bitmap;

merge, by the processor, the updated first and second out-of-sync bitmaps into an updated merged out-of-sync bitmap;

use, by the processor, the actual performance to divide the updated merged out-of-sync bitmap into two updated portions, wherein a size of a first of the two updated portions correlates to actual throughput experienced from the first recovery site to the production site, wherein a size of a second of the two updated portions correlates to actual throughput experienced from the second recovery site to the production site;

send, by the processor, a request to the first recovery site for data which corresponds to the first updated portion of the updated merged out-of-sync bitmap;

send, by the processor, a request to the second recovery site for data which corresponds to the second updated portion of the updated merged out-of-sync bitmap; and receive, by the processor, the data which corresponds to the first and second updated portions of the updated merged out-of-sync bitmap respectively, in parallel.

11. The computer program product of claim 10, wherein the data which corresponds to the first and second updated portions of the updated merged out-of-sync bitmap respectively, are fully received in substantially a same amount of time.

12. The computer program product of claim 10, wherein a total amount of time spent receiving the data which corresponds to the first and second updated portions of the updated merged out-of-sync bitmap is reduced by using the actual performance to divide the updated merged out-of-sync bitmap into the two updated portions.

13. The computer program product of claim 8, wherein the performance data is selected from the group consisting of: data granularity, response time, distance between sites, a number of data paths between sites, and data throughput.

14. The computer program product of claim 8, the program instructions readable and/or executable by the processor to cause the processor to:

send, by the processor, a data loss bitmap to each of the first and second recovery sites, wherein the out-of-sync bitmaps received from the first and second recovery sites are formed using the data loss bitmap.

15. A system, comprising:

a hardware processor; and logic integrated with the hardware processor, executable by the hardware processor, or integrated with and executable by the hardware processor, the logic being configured to:

detect, by the hardware processor, an outage at a production site;

transfer, by the hardware processor, input/output (I/O) functionality to a first recovery site;

in response to determining that the outage at the production site has been resolved, receive, by the hardware processor, a first out-of-sync bitmap from the first recovery site;

receive, by the hardware processor, a second out-of-sync bitmap from a second recovery site, wherein the second recovery site serves as a synchronous mirrored copy to the first recovery site;

merge, by the hardware processor, the first and second out-of-sync bitmaps into a merged out-of-sync bitmap;

receive, by the hardware processor, performance data which corresponds to achievable throughput from each of the first and second recovery sites to the production site;

use, by the hardware processor, the performance data to divide the merged out-of-sync bitmap into two portions, wherein a size of a first of the two portions correlates to the achievable throughput from the first recovery site to the production site, wherein a size of a second of the two portions correlates to the achievable throughput from the second recovery site to the production site;

send, by the hardware processor, a request to the first recovery site for data which corresponds to the first portion of the merged out-of-sync bitmap;

send, by the hardware processor, a request to the second recovery site for data which corresponds to the second portion of the merged out-of-sync bitmap; and receive, by the hardware processor, the data which corresponds to the first and second portions of the merged out-of-sync bitmap respectively, in parallel.

16. The system of claim 15, wherein the data which corresponds to the first and second portions of the merged out-of-sync bitmap respectively, is fully received in substantially a same amount of time.

17. The system of claim 15, the logic being configured to:

detect, by the hardware processor, that a difference between actual performance and the performance data used to divide the merged out-of-sync bitmap into the two portions has exceeded a predefined threshold;

send, by the hardware processor, a request to the first recovery site for an updated version of the first out-of-sync bitmap;

send, by the hardware processor, a request to the second recovery site for an updated version of the second out-of-sync bitmap;

merge, by the hardware processor, the updated first and second out-of-sync bitmaps into an updated merged out-of-sync bitmap;

use, by the hardware processor, the actual performance to divide the updated merged out-of-sync bitmap into two updated portions, wherein a size of a first of the two updated portions correlates to actual throughput experienced from the first recovery site to the production site, wherein a size of a second of the two updated portions correlates to actual throughput experienced from the second recovery site to the production site;

send, by the hardware processor, a request to the first recovery site for data which corresponds to the first updated portion of the updated merged out-of-sync bitmap;

send, by the hardware processor, a request to the second recovery site for data which corresponds to the second updated portion of the updated merged out-of-sync bitmap; and receive, by the hardware processor, the data which corresponds to the first and second updated portions of the updated merged out-of-sync bitmap respectively, in parallel.

18. The system of claim 17, wherein the data which corresponds to the first and second updated portions of the updated merged out-of-sync bitmap respectively, are fully received in substantially a same amount of time.

19. The system of claim 17, wherein a total amount of time spent receiving the data which corresponds to the first and second updated portions of the updated merged out-of-sync bitmap is reduced by using the actual performance to divide the updated merged out-of-sync bitmap into the two updated portions.

20. The system of claim 15, the logic being configured to:

send, by the hardware processor, a data loss bitmap to each of the first and second recovery sites, wherein the out-of-sync bitmaps received from the first and second recovery sites are formed using the data loss bitmap.

* * * * *